United States Patent
Banville et al.

(10) Patent No.: US 12,523,174 B1
(45) Date of Patent: Jan. 13, 2026

(54) MOUNTING SEAL RUNNER ONTO AIRCRAFT POWERPLANT ROTOR

(71) Applicant: Pratt & Whitney Canada Corp., Longueuil (CA)

(72) Inventors: Rose-Elizabeth Banville, Longueuil (CA); Julien Lalonde Hamel, Varennes (CA); Frederic Labrie, St-Jude (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/899,925

(22) Filed: Sep. 27, 2024

(51) Int. Cl.
*F02C 7/28* (2006.01)

(52) U.S. Cl.
CPC ............ *F02C 7/28* (2013.01); *F05D 2230/60* (2013.01); *F05D 2240/55* (2013.01)

(58) Field of Classification Search
CPC ............................. F02C 7/28; F05D 2230/60
See application file for complete search history.

(56) References Cited

U.S. PATENT DOCUMENTS

| | | | |
|---|---|---|---|
| 5,220,784 A * | 6/1993 | Wilcox | F01D 25/285 |
| | | | 416/198 A |
| 7,334,982 B2 | 2/2008 | Singh | |
| 10,221,761 B2 * | 3/2019 | Sandoval | F01D 5/02 |
| 10,364,846 B2 | 7/2019 | Clark | |
| 11,203,948 B2 | 12/2021 | Labbe | |
| 2003/0017050 A1 * | 1/2003 | Simeone | F01D 5/066 |
| | | | 416/220 R |

* cited by examiner

Primary Examiner — Courtney D Heinle
Assistant Examiner — Cameron A Corday
(74) Attorney, Agent, or Firm — Getz Balich LLC

(57) ABSTRACT

A method is provided for assembling a structure of an aircraft powerplant. This method includes mounting a seal runner onto a rotor using an installation tool, the installation tool including an inner locating surface and an outer locating surface, the inner locating surface axially recessed from and radially inboard of the outer locating surface. The mounting of the seal runner includes axially pressing a runner mount onto the rotor by moving the installation tool axially towards the rotor, with the outer locating surface axially pressed against a distal end of the seal runner, until the inner locating surface axially engages the distal end of the rotor. After the seal runner is mounted onto the rotor using the installation tool, the runner mount is attached to the rotor through a radial interference fit between the runner mount and the rotor and the runner mount is axially disengaged from the rotor.

19 Claims, 4 Drawing Sheets

MOUNTING SEAL RUNNER ONTO AIRCRAFT POWERPLANT ROTOR

TECHNICAL FIELD

This disclosure relates generally to an aircraft and, more particularly, to a seal assembly for an aircraft powerplant.

BACKGROUND INFORMATION

An aircraft powerplant such as a gas turbine engine typically includes multiple seal assemblies. Such seal assemblies may include a seal runner. Various types and configurations of seal runners are known in the art. Various methods are also known in the art for installing a seal runner. While these known installation methods have various benefits, there is still room in the art for improvement.

SUMMARY

According to an aspect of the present disclosure, a method is provided for assembling a structure of an aircraft powerplant. This method includes: aligning a seal runner coaxial with a rotor of the aircraft powerplant, the seal runner including a runner mount and a seal land disposed radially outboard of the runner mount, the runner mount projecting axially along an axis to a distal end of the seal runner, and the rotor projecting axially along the axis to a distal end of the rotor; and mounting the seal runner onto the rotor using an installation tool, the installation tool including an inner locating surface and an outer locating surface, the inner locating surface axially recessed from and radially inboard of the outer locating surface. The mounting of the seal runner includes axially pressing the runner mount onto the rotor by moving the installation tool axially towards the rotor, with the outer locating surface axially pressed against the distal end of the seal runner, until the inner locating surface axially engages the distal end of the rotor. After the seal runner is mounted onto the rotor using the installation tool, the runner mount is attached to the rotor through a radial interference fit between the runner mount and the rotor and the runner mount is axially disengaged from the rotor.

According to another aspect of the present disclosure, another method is provided for assembling a structure of an aircraft powerplant. This method includes: arranging a seal runner with a rotor of the aircraft powerplant, the seal runner including a runner mount and a seal land disposed radially outboard of the runner mount, the runner mount projecting axially along an axis to a distal end of the seal runner, and the rotor projecting axially along the axis to a distal end of the rotor; and mounting the seal runner onto the rotor using an installation tool, the installation tool including an inner locating surface and an outer locating surface, the inner locating surface axially recessed from and radially inboard of the outer locating surface. The mounting of the seal runner includes axially pressing the runner mount onto the rotor by moving the installation tool axially towards the rotor, with the outer locating surface axially pressed against the distal end of the seal runner, until the inner locating surface axially engages the distal end of the rotor. After the seal runner is mounted onto the rotor using the installation tool, the runner mount is attached to the rotor through a radial interference fit between the runner mount and the rotor and the runner mount is axially unloaded.

According to still another aspect of the present disclosure, another method is provided for assembling a structure of a gas turbine engine. This method includes: providing a rotor of the gas turbine engine extending circumferentially around an axis, the rotor including a rotor base and a rotor notch, the rotor base projecting axially to a rotor distal end and radially to a rotor base outer side, the rotor notch projecting axially into the rotor base from the rotor distal end to a rotor base shoulder, and the rotor notch projecting radially inward into the rotor base towards the axis from the rotor base outer side to a rotor notch bottom side; providing a seal runner extending circumferentially around the axis, the seal runner including a runner mount and a seal land disposed radially outboard of the runner mount, the runner mount including a mount base and a mount rim, the mount base projecting axially to a seal runner distal end, and the mount rim located at the seal runner distal end and projecting radially inward from the mount base to a mount rim distal end; arranging the mount base coaxial with the rotor base; and pressing the mount base onto the rotor base to mount the seal runner to the rotor. After the seal runner is mounted onto the rotor: the runner mount is attached to the rotor through a radial interference fit between the mount base and the rotor base; the mount rim is disposed in the rotor notch axially next to and disengaged from the rotor base shoulder, and the mount rim distal end radially spaced from the rotor notch bottom side; and the seal runner distal end axially recessed from the rotor distal end.

The method may also include removing the installation tool following the mounting of the seal runner and prior to full assembly of the aircraft powerplant.

After the seal runner is mounted onto the rotor using the installation tool, the runner mount may be axially unloaded against the rotor.

After the seal runner is mounted onto the rotor using the installation tool, a shoulder of the runner mount may be located axially next to, but does not contact, a shoulder of the rotor.

After the seal runner is mounted onto the rotor using the installation tool, the distal end of the seal runner may be axially recessed from the distal end of the rotor.

The installation tool may also include a guide surface that circumscribes and radially contacts the runner mount during the mounting of the seal runner.

During the mounting of the seal runner, the runner mount may project axially into a receptacle in the installation tool. The receptacle may extend radially within the installation tool out from the axis to the guide surface. The receptacle may project axially along the axis into the installation tool from a distal end of the installation tool to the inner locating surface and the outer locating surface.

The method may also include removing the installation tool following the mounting of the seal runner.

The method may also include arranging a seal element with the seal runner such that the seal element radially sealingly engages the seal land.

The runner mount and the rotor may be at room temperature when the runner mount is pressed onto the rotor.

The method may also include heating the seal runner such that the runner mount is at a higher temperature than the rotor when the runner mount is pressed onto the rotor.

The rotor may include a rotor base and a rotor notch. The rotor base may project axially along the axis to the distal end of the rotor. The rotor notch may project axially along the axis into the rotor base from the distal end of the rotor to a shoulder of the rotor base. The runner mount may include a mount base and a mount rim located at the distal end of the seal runner. The mount base may project axially along the axis to the distal end of the seal runner. The mount rim may project radially inward towards the axis from the mount base. After the seal runner is mounted onto the rotor using the installation tool, the mount base may be attached to the rotor base through the radial interference fit and the mount rim may be disposed in the rotor notch axially next to the shoulder of the rotor base.

The mount rim may be axially spaced from the shoulder of the rotor base.

The seal runner may also include a runner arm radially between and connected to runner mount and the seal land.

The mount rim may be radially spaced from the rotor base.

The distal end of the seal runner may be a first end of the runner mount. The runner mount may extend axially along the axis from the first end of the runner mount to a second end of the runner mount. The runner arm may be disposed at the second end of the runner mount.

The seal land may extend axially along the axis from a first end of the seal land to a second end of the seal land. The runner arm may be connected to the seal land at an intermediate location axially between the first end of the seal land and the second end of the seal land.

The aircraft powerplant may be configured as or otherwise include a gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods and tools for assembling together components of a powerplant for an aircraft. The aircraft may be an airplane, a helicopter, a drone (e.g., an unmanned aerial vehicle (UAV)) or any other manned or unmanned aerial vehicle or system. The aircraft powerplant may be configured as, or otherwise included as part of, a propulsion system for the aircraft. The aircraft powerplant, for example, may be a turbofan engine, a turbojet engine, a turboprop engine, a turboshaft engine, or any other type of internal combustion engine configured to generate thrust and/or drive operation of an air mover; e.g., a ducted or open propulsor rotor. The aircraft powerplant may alternatively (or also) be configured as, or otherwise included as part of, a power generation system for the aircraft. The aircraft powerplant, for example, may be an auxiliary power unit (APU) or any other type of internal combustion engine configured to mechanically power operation of an electrical generator. The present disclosure, however, is not limited to such exemplary aircraft powerplants. The aircraft powerplant, for example, may alternatively be configured as or otherwise include a hybrid-electric powerplant, an electric motor, or another power unit with components which may be assembled as described herein.

Figure 1:
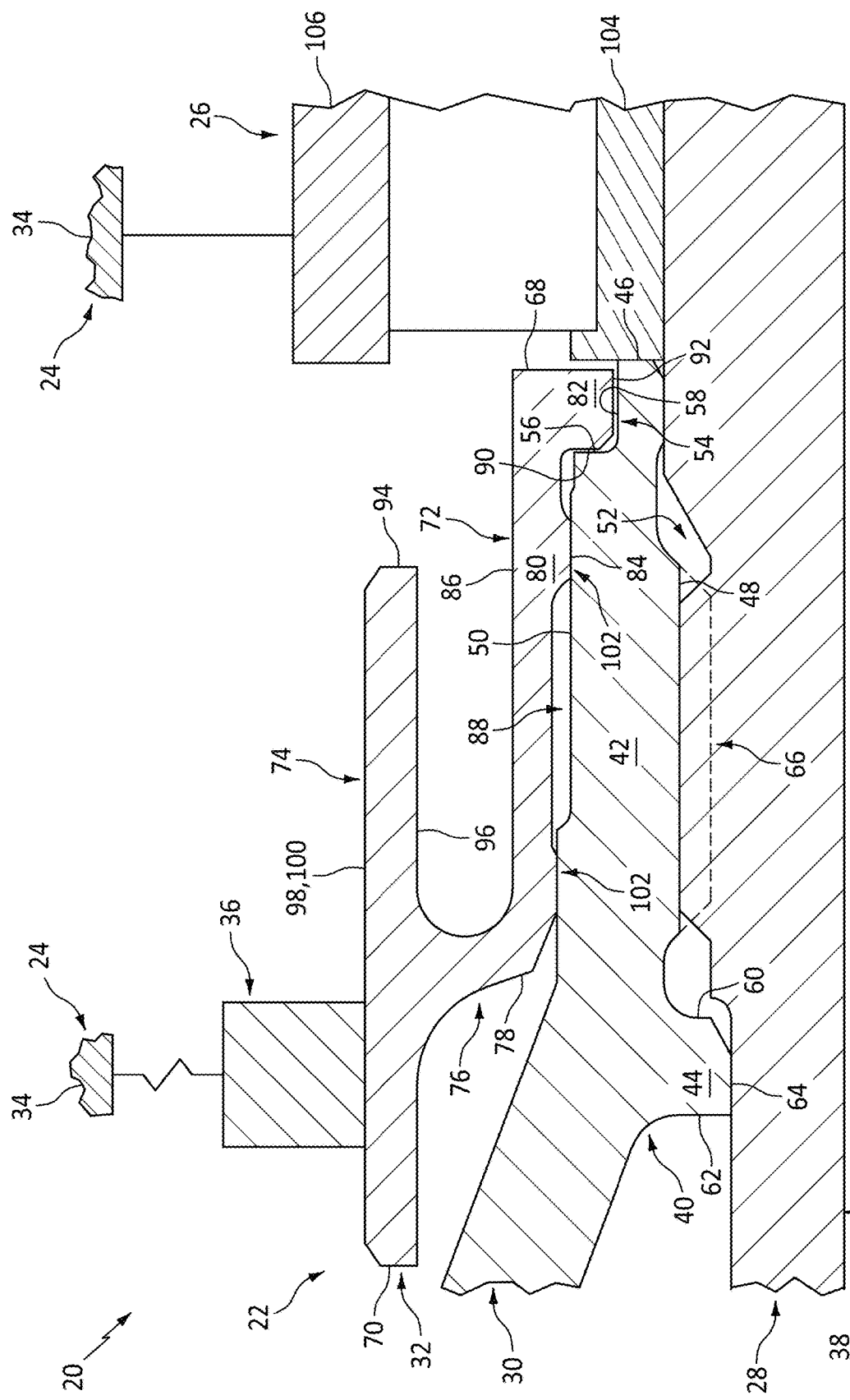
FIG. 1 is a partial sectional illustration of a powerplant structure for an aircraft.

FIG. 1 illustrates a structure 20 of the aircraft powerplant with an exemplary arrangement of the powerplant components to be assembled together using the methods and/or tools of the present disclosure. The powerplant structure 20 of FIG. 1 includes a rotating assembly 22, a stationary assembly 24 and a bearing 26. The rotating assembly 22 includes a powerplant shaft 28, a powerplant rotor 30 and a powerplant seal runner 32. The stationary assembly 24 includes a powerplant support structure 34 (e.g., a case, a frame, etc.) and a powerplant seal element 36; e.g., a carbon seal element.

The powerplant shaft 28 of FIG. 1 extends axially along and circumferentially about an axis 38. Briefly, the axis 38 may be a centerline axis of the aircraft powerplant and/or a centerline axis of one or more of the powerplant structure members 28, 30, 32, 34 and/or 36. The axis 38 may also or alternatively be a rotational axis of the rotating assembly 22 and its rotating assembly members 28, 30 and/or 32.

The powerplant rotor 30 may be configured as or otherwise include a bladed rotor disk of the aircraft powerplant; e.g., a bladed compressor rotor disk, a bladed turbine rotor disk, etc. The powerplant rotor 30 of FIG. 1 includes a rotor mount 40 configured to mount the powerplant rotor 30 to the powerplant shaft 28. This rotor mount 40 includes a rotor base 42 and a rotor rim 44.

The rotor base 42 projects axially along the axis 38 to an axial distal end 46 of the powerplant rotor 30 and its rotor base 42. The rotor base 42 extends radially from a radial inner side 48 of the rotor base 42 to a radial outer side 50 of the rotor base 42. The rotor base 42 extends circumferentially about (e.g., completely around) the axis 38, providing the rotor base 42 of FIG. 1 with a full-hoop (e.g., tubular) geometry. With this arrangement, the rotor base inner side 48 forms at least a major portion of a radial outer peripheral boundary of a central bore 52 of the rotor mount 40 and its rotor base 42.

Figure 2:
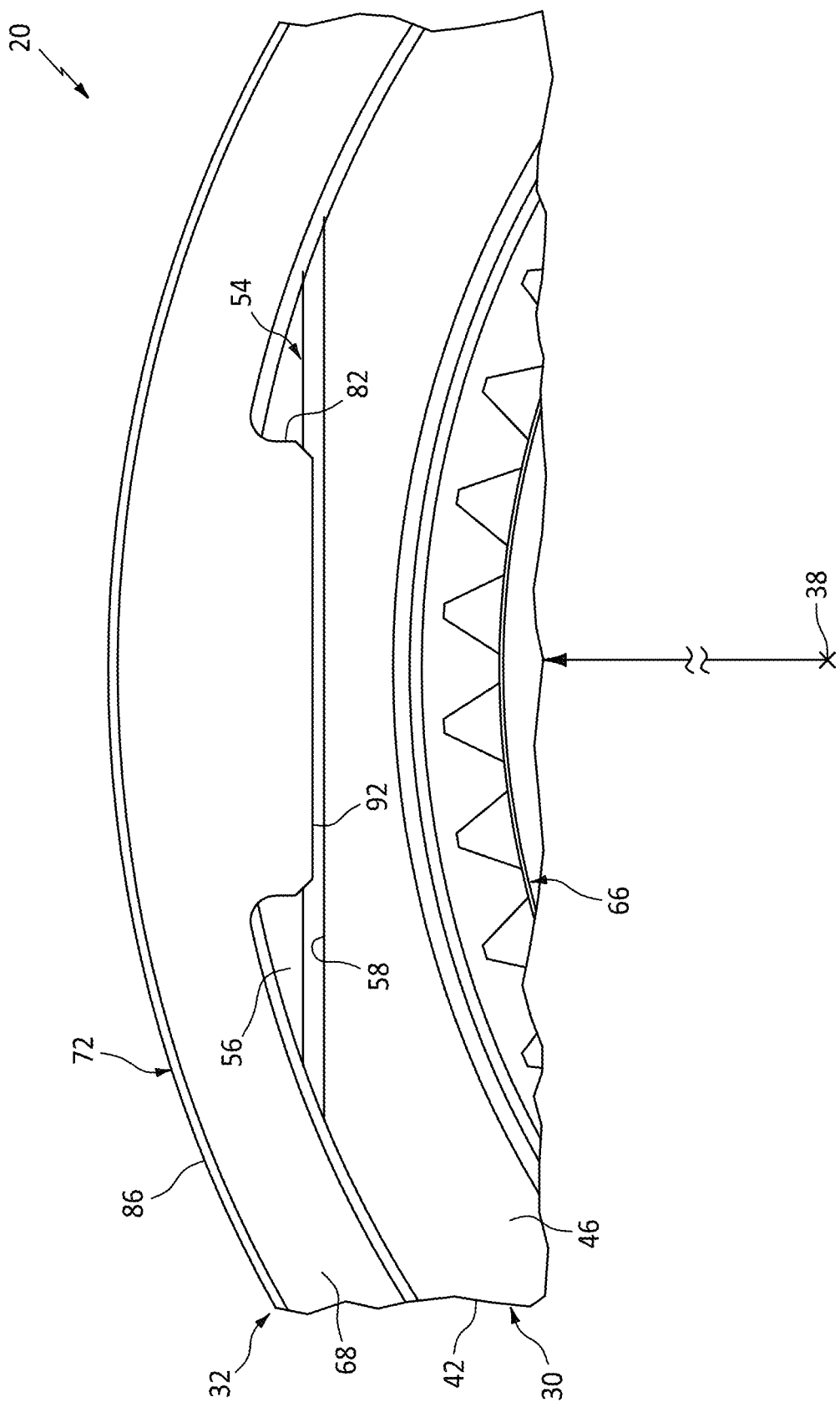
FIG. 2 is a partial end view illustration at an interface between a seal runner and a rotor.

The rotor base 42 of FIG. 1 is configured with a rotor notch 54 located at the rotor distal end 46 and the rotor base outer side 50. The rotor notch 54 projects axially along the axis 38 partially into the powerplant rotor 30 and its rotor base 42 from the rotor distal end 46 to a shoulder 56 (e.g., a non-annular or annular shoulder) of the rotor base 42. Here, the rotor base shoulder 56 may be arranged perpendicular to the axis 38 when viewed, for example, in a reference plane parallel with (e.g., including) the axis 38; e.g., the plane of FIG. 1. The rotor notch 54 projects radially inward (e.g., towards the axis 38) partially into the powerplant rotor 30 and its rotor base 42 from the rotor base outer side 50 to a radial inner bottom side 58 of the rotor notch 54. Here, the rotor notch bottom side 58 may be arranged parallel with the axis 38 when viewed, for example, in the reference plane. The rotor notch 54 also extends within the powerplant rotor 30 and its rotor base 42, along the rotor base shoulder 56 and the rotor notch bottom side 58, circumferentially about (e.g., partially or completely around) the axis 38. Referring to FIG. 2, where the rotor notch 54 extends partially about the axis 38, the rotor notch 54 may function as an anti-rotation feature for the seal runner 32.

The rotor rim 44 of FIG. 1 is connected to (e.g., formed integral with or otherwise attached to) the rotor base 42. The rotor rim 44 extends axially along the axis 38 between a first side 60 of the rotor rim 44 and a second side 62 of the rotor rim 44. The rotor rim 44 projects radially inward from the rotor base 42 to a radial inner distal end 64 of the rotor rim 44. The rotor rim 44 extends circumferentially about (e.g., completely around) the axis 38, providing the rotor rim 44 of FIG. 1 with a full-hoop (e.g., annular) geometry. With this arrangement, the rotor rim distal end 64 may form a minor portion of the radial outer peripheral boundary of the rotor mount bore 52.

The rotor mount 40 is mated with the powerplant shaft 28. The powerplant shaft 28 of FIG. 1, for example, projects axially through the rotor mount bore 52. The rotor mount 40 and its rotor base 42 thereby axially overlap and circumscribe the powerplant shaft 28. The rotor base 42 is (e.g., rotationally) fixed to the powerplant shaft 28 through, for example, a splined connection 66 between the rotor base 42 and the powerplant shaft 28.

The powerplant seal runner 32 extends axially along the axis 38 from an axial distal first end 68 of the powerplant seal runner 32 to an axial distal second end 70 of the powerplant seal runner 32. The powerplant seal runner 32 of FIG. 1 includes a runner mount 72, a runner seal land 74 and a runner arm 76. The powerplant seal runner 32 and its runner members 72, 74 and 76 extend circumferentially about (e.g., completely around), providing the powerplant seal runner 32 of FIG. 1 and each of its runner members 72, 74 and 76 with a full-hoop (e.g., tubular or annular) geometry.

The runner mount 72 is disposed at the runner first end 68. The runner mount 72 of FIG. 1, for example, extends axially along the axis 38 from the runner first end 68 to an axial second end 78 of the runner mount 72. The runner mount 72 of FIG. 1 includes a mount base 80 and a mount rim 82.

The mount base 80 extends axially along the axis 38 from the runner first end 68 to the runner mount second end 78. The mount base 80 extends radially from a radial inner side 84 of the mount base 80 to a radial outer side 86 of the runner mount 72 and its mount base 80. The mount base 80 extends circumferentially about (e.g., completely around) the axis 38, providing the mount base 80 of FIG. 1 with a full-hoop (e.g., tubular) geometry. With this arrangement, the rotor base inner side 84 forms a major portion of a radial outer peripheral boundary of a central bore 88 of the runner mount 72 and its mount base 80.

The mount rim 82 is connected to (e.g., formed integral with or otherwise attached to) the mount base 80. The mount rim 82 is disposed at the runner first end 68. The mount rim 82 of FIG. 1, for example, extends axially along the axis 38 from the runner first end 68 to an axially opposing shoulder 90 of the runner mount 72 and its mount rim 82. Here, the runner mount shoulder 90 may be arranged perpendicular to the axis 38 when viewed, for example, in the reference plane. The mount rim 82 projects radially inward from the mount base 80 at its rotor base inner side 84 to a radial inner distal end 92 of the mount rim 82. Here, the mount rim end 92 may be arranged parallel with the axis 38 when viewed, for example, in the reference plane. The mount rim 82 extends circumferentially about (e.g., partially or completely around) the axis 38; see also FIG. 2. With this arrangement, the mount rim end 92 forms a minor portion of the radial outer peripheral boundary of the runner mount bore 88.

The runner seal land 74 is disposed at the runner second end 70. The runner seal land 74 of FIG. 1, for example, extends axially along the axis 38 from an axial distal first end 94 of the runner seal land 74 to the runner second end 70. The runner seal land 74 extends radially from a radial inner side 96 of the runner seal land 74 to a radial outer side 98 of the runner seal land 74 and, more generally, a radial outer side of the powerplant seal runner 32. The runner seal land 74 of FIG. 1 is configured with a seal land surface 100 at the seal land outer side 98. This seal land surface 100 may be a cylindrical surface. More particularly, the seal land surface 100 may have a straight-line geometry that is parallel with the axis 38 when viewed, for example, in the reference plane.

The runner arm 76 is connected to (e.g., formed integral with or otherwise attached to) the runner mount 72 and the runner seal land 74. This runner arm 76 projects radially outward (e.g., away from the axis 38) from the runner mount 72 and its mount base 80 to the runner seal land 74. The runner arm 76 of FIG. 1 is disposed at the runner mount second end 78 and axially spaced from the runner first end 68. The runner arm 76 of FIG. 1 is connected to runner seal land 74 at an intermediate location along the runner seal land 74 between the seal land first end 94 and the runner second end 70. Here, an axial distance from the seal land first end 94 to the runner arm 76 is (e.g., slightly) larger than an axial distance from the runner second end 70 to the runner arm 76. The present disclosure, however, is not limited to such an exemplary arrangement.

The powerplant seal runner 32 is mounted onto the powerplant rotor 30. More particularly, the runner mount 72 is mounted onto the rotor mount 40. The rotor mount 40 of FIG. 1, for example, projects axially through the runner mount bore 88. The runner mount 72 and its mount base 80 thereby axially overlap and circumscribe the rotor mount 40 and its rotor base 42. The mount base 80 is (e.g., axially and rotationally) fixed to the rotor base 42 through one or more radial interference fits 102 (e.g., a press fit) between the mount base 80 and the rotor base 42. The runner first end 68 is axially recessed from the rotor distal end 46 along the axis 38. The runner mount shoulder 90 is disposed axially next to (e.g., axially adjacent without any intervening elements) the rotor base shoulder 56. However, the runner mount shoulder 90 of FIG. 1 may be (e.g., slightly) axially spaced from the rotor base shoulder 56 such that the powerplant seal runner 32 and its runner mount 72 are axially disengaged from the powerplant rotor 30 and its rotor mount 40. By providing such an arrangement between the runner mount 72 and the rotor mount 40, the runner mount 72 is not preloaded against the rotor mount 40 following assembly of the powerplant structure 20. The arrangement between the runner mount 72 and the rotor mount 40 may thereby reduce internal stresses within the powerplant seal runner 32 and its runner mount 72 which may otherwise reduce a useful lifespan of the powerplant seal runner 32.

The powerplant seal element 36 is flexibly mounted with the powerplant support structure 34. The powerplant seal element 36 is disposed radially outboard of and circumscribes the powerplant seal runner 32 and its runner seal land 74. The powerplant seal element 36 of FIG. 1 also radially sealingly engages (e.g., through a slight fluid buffer cushion, directly at a local point contact during high vibrations and/or a transient regime, etc.) the runner seal land 74 and its seal land surface 100. The powerplant seal element 36 and the powerplant seal runner 32 may thereby (e.g., substantially) seal an annular gap between the powerplant rotor 30 and the powerplant support structure 34.

The bearing 26 is configured to rotatably mount the rotating assembly 22 to the stationary assembly 24. An inner race 104 of the bearing 26 of FIG. 1, for example, is mounted onto the powerplant shaft 28. The bearing 26 and its inner race 104 are abutted axially against or otherwise axially engage the rotor distal end 46. The bearing 26 and its inner race 104, however, are axially spaced from the runner first end 68 by an axial gap; e.g., an air gap. An outer race 106 of the bearing 26 of FIG. 1 is mounted to powerplant support structure 34. Note, while the bearing 26 of FIG. 1 is described above as being axially next to the powerplant rotor 30 and the powerplant seal runner 32, it is contemplated another component of the aircraft powerplant may be disposed axially between (a) the bearing 26 and (b) the powerplant rotor 30 and the powerplant seal runner 32.

Figure 3:
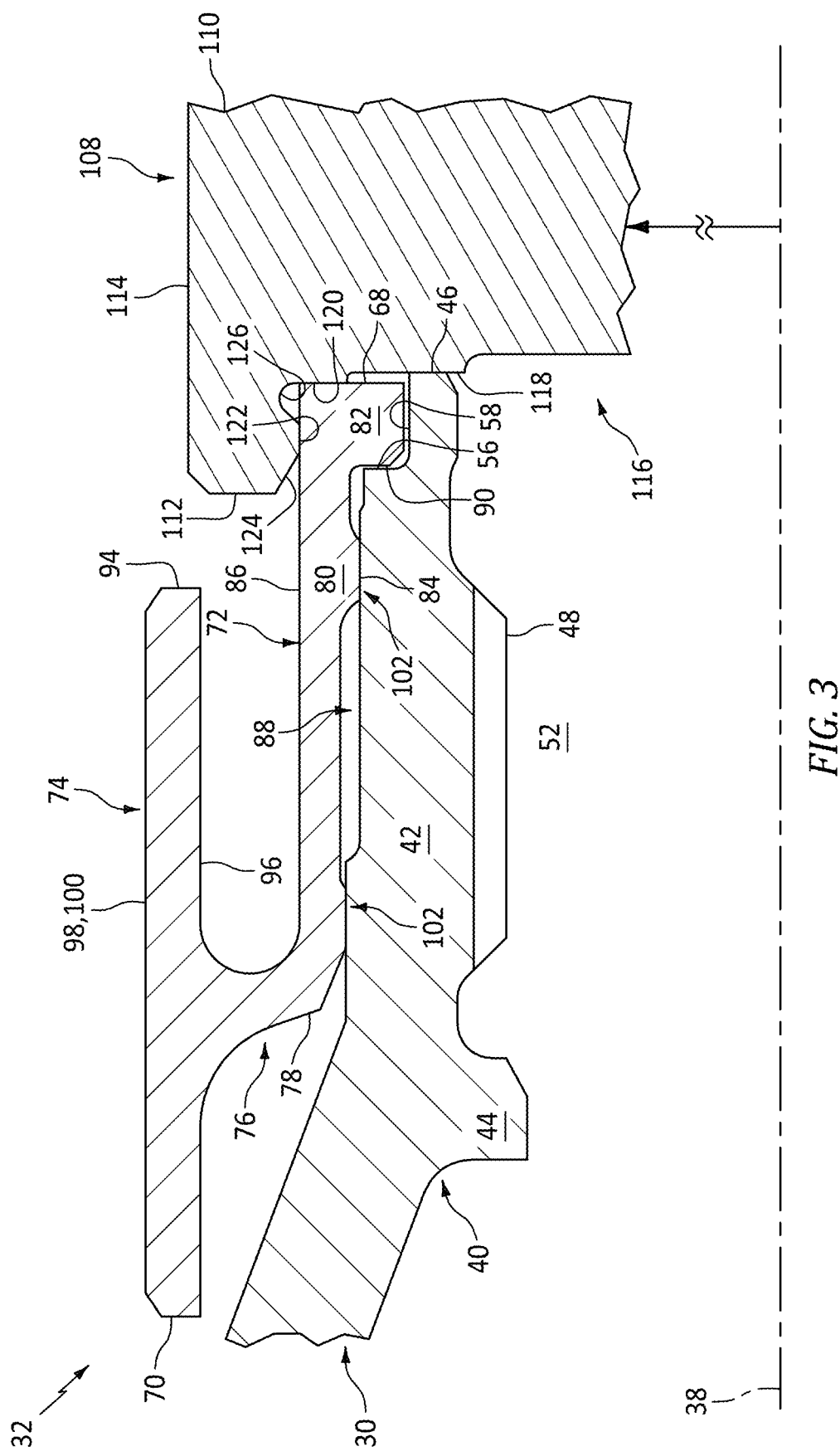
FIG. 3 is a partial sectional illustration of the seal runner being mounted onto the rotor using an installation tool.

FIG. 3 illustrates an installation tool 108 used for mounting the powerplant seal runner 32 into the powerplant rotor 30. This installation tool 108 extends axially along the axis 38 from an axial first end 110 of the installation tool 108 to an axial second end 112 of the installation tool 108. The installation tool 108 projects radially outward to a radial outer side 114 of the installation tool 108.

The installation tool 108 of FIG. 3 is configured with a receptacle 116 for receiving (a) the powerplant seal runner 32 and its runner mount 72 and (b) the powerplant rotor 30 and its rotor mount 40. The receptacle 116 of FIG. 3 projects axially along the axis 38 partially into the installation tool 108 from the tool second end 112 to one or more locating surfaces 118 and 120 of the installation tool 108 at an axial distal end of the receptacle 116. The receptacle 116 of FIG. 3 projects radially outward within the installation tool 108 to a guide surface 122 of the installation tool 108 at a radial outer side of the receptacle 116.

Each of the locating surfaces 118 and 120 may have a straight-line geometry that is perpendicular with the axis 38 when viewed, for example, in the reference plane. Each of the locating surfaces 118 and 120 extends circumferentially about (e.g., completely around) the axis 38, providing each respective locating surface 118, 120 of FIG. 3 with a full-hoop (e.g., annular) geometry. The inner locating surface 118 is axially recessed from the outer locating surface 120 along the axis 38. The outer locating surface 120 is disposed radially outboard of and may be radially adjacent the inner locating surface 118.

The guide surface 122 may have a straight-line geometry that is parallel with the axis 38 when viewed, for example, in the reference plane. The guide surface 122 extends circumferentially about (e.g., completely around) the axis 38, providing the guide surface 122 of FIG. 3 with a full-hoop (e.g., annular) geometry. The guide surface 122 may be axially spaced from the tool second end 112 where, for example, an annular chamfer 124 is axially between the guide surface 122 and the tool second end 112. The guide surface 122 may also be axially spaced from the outer locating surface 120 where, for example, an annular concave surface 126 is axially between the guide surface 122 and the outer locating surface 120. Here, the concave surface 126 of FIG. 3 forms an annular relief in the installation tool 108.

Figure 4:
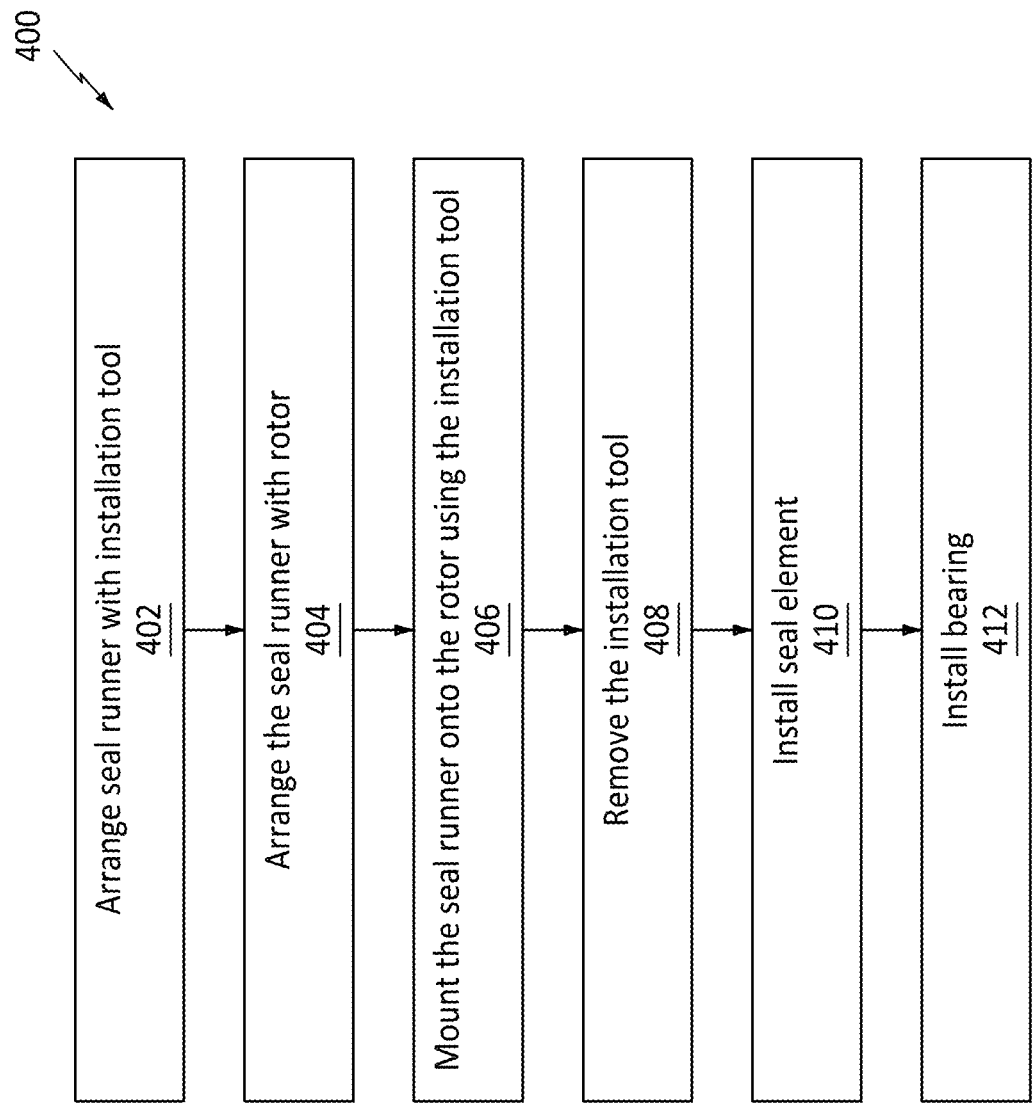
FIG. 4 is a flow diagram of a method for assembling a powerplant structure.

FIG. 4 is a flow diagram of a method 400 for at least partially assembling a powerplant structure. For ease of description, this assembly method 400 is described below with reference to the powerplant structure 20 of FIG. 1 and the installation tool 108 of FIG. 3. The installation method 400 of the present disclosure, however, is not limited to assembling such an exemplary powerplant structure nor to using such an exemplary installation tool.

In step 402, the powerplant seal runner 32 is arranged with the installation tool 108. The powerplant seal runner 32 and its runner mount 72, for example, may be inserted into the receptacle 116 of the installation tool 108. Within the receptacle 116, the guide surface 122 extends axially along, circumscribes and radially engages the mount base 80 and the runner mount outer side 86. The powerplant seal runner 32 and its runner mount 72 may thereby be centered within the receptacle 116. Also within the receptacle 116, the runner first end 68 is axially abutted against or otherwise axially engages the outer locating surface 120. The installation tool 108 may thereby axially push the powerplant seal runner 32 and its runner mount 72 axially along the axis 38.

In step 404, the powerplant seal runner 32 is arranged with the powerplant rotor 30 for mounting. The powerplant seal runner 32 as well as the installation tool 108, for example, may be aligned coaxial with the powerplant rotor 30.

In step 406, the powerplant seal runner 32 is mounted onto the powerplant rotor 30 using the installation tool 108. For example, while a position of the powerplant rotor 30 is fixed, the installation tool 108 may be moved (e.g., translated) axially along the axis 38 in an axial direction towards the powerplant rotor 30. By axially moving the installation tool 108, the runner mount 72 and its mount base 80 is axially pressed onto the rotor mount 40 and its rotor base 42 until, for example, the inner locating surface 118 axially abuts against or otherwise axially engages the rotor distal end 46. Here, the installation tool 108 is sized such that an axial offset between the inner locating surface 118 and the outer locating surface 120 is less than a difference between an axial length of the mount rim 82 and an axial length of the rotor notch 54. Thus, when the inner locating surface 118 axially engages the rotor distal end 46, (a) the runner first end 68 is axially recessed from the rotor distal end 46 and (b) the runner mount shoulder 90 may be (e.g., slightly) axially spaced from or otherwise axially unloaded against the rotor base shoulder 56.

In step 408, the installation tool 108 is removed following the mounting of the powerplant seal runner 32 onto the powerplant rotor 30. Note, the installation tool 108 of FIG. 3 is not configured as a part of the aircraft powerplant and, thus, is removed prior to complete assembly and operation of the aircraft powerplant.

In step 410, the powerplant seal element 36 is installed to radially sealingly engage the powerplant seal runner 32 and its runner seal land 74. Here, when the runner seal land 74 is rotationally stationary, the powerplant seal element 36 may radially contact the powerplant seal runner 32 and its runner seal land 74. However, when the runner seal land 74 rotates, a slight fluid buffer cushion may be formed radially between the powerplant seal element 36 and the runner seal land 74.

In step 412, the bearing 26 is installed to rotatably mount the rotating assembly 22 with the stationary assembly 24.

In some embodiments, the powerplant seal runner 32 and its runner mount 72 as well as the powerplant rotor 30 and its rotor mount 40 may be at room temperature (or another common temperature) when the runner mount 72 is pressed onto the rotor mount 40. In other embodiments, the powerplant seal runner 32 and its runner mount 72 may be preheated (e.g., to induce thermal expansion) such that the powerplant seal runner 32 and its runner mount 72 are at a higher temperature than the powerplant rotor 30 and its rotor mount 40 when the runner mount 72 is pressed onto the rotor mount 40.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for assembling a structure of an aircraft powerplant, comprising:
aligning a seal runner coaxial with a rotor of the aircraft powerplant, the seal runner including a runner mount and a seal land disposed radially outboard of the runner mount, the runner mount projecting axially along an axis to a distal end of the seal runner, and the rotor projecting axially along the axis to a distal end of the rotor; and
mounting the seal runner onto the rotor using an installation tool, the installation tool including an inner locating surface and an outer locating surface, the inner locating surface axially recessed from and radially inboard of the outer locating surface, and the mounting of the seal runner comprising axially pressing the runner mount onto the rotor by moving the installation tool axially towards the rotor, with the outer locating surface axially pressed against the distal end of the seal runner, until the inner locating surface axially engages the distal end of the rotor;
wherein, after the seal runner is mounted onto the rotor using the installation tool, the runner mount is attached to the rotor through a radial interference fit between the runner mount and the rotor and the runner mount is axially disengaged from the rotor.

2. The method of claim 1, wherein, after the seal runner is mounted onto the rotor using the installation tool, the runner mount is axially unloaded against the rotor.

3. The method of claim 1, wherein, after the seal runner is mounted onto the rotor using the installation tool, a shoulder of the runner mount is located axially next to, but does not contact, a shoulder of the rotor.

4. The method of claim 1, wherein, after the seal runner is mounted onto the rotor using the installation tool, the distal end of the seal runner is axially recessed from the distal end of the rotor.

5. The method of claim 1, wherein the installation tool further includes a guide surface that circumscribes and radially contacts the runner mount during the mounting of the seal runner.

6. The method of claim 5, wherein
during the mounting of the seal runner, the runner mount projects axially into a receptacle in the installation tool;
the receptacle extends radially within the installation tool out from the axis to the guide surface; and
the receptacle projects axially along the axis into the installation tool from a distal end of the installation tool to the inner locating surface and the outer locating surface.

7. The method of claim 1, further comprising removing the installation tool following the mounting of the seal runner.

8. The method of claim 1, further comprising arranging a seal element with the seal runner such that the seal element radially sealingly engages the seal land.

9. The method of claim 1, wherein the runner mount and the rotor are at room temperature when the runner mount is pressed onto the rotor.

10. The method of claim 1, further comprising heating the seal runner such that the runner mount is at a higher temperature than the rotor when the runner mount is pressed onto the rotor.

11. The method of claim 1, wherein
the rotor includes a rotor base and a rotor notch, the rotor base projects axially along the axis to the distal end of the rotor, the rotor notch projects axially along the axis into the rotor base from the distal end of the rotor to a shoulder of the rotor base;
the runner mount includes a mount base and a mount rim located at the distal end of the seal runner, the mount base projects axially along the axis to the distal end of the seal runner, and the mount rim projects radially inward towards the axis from the mount base; and
after the seal runner is mounted onto the rotor using the installation tool, the mount base is attached to the rotor base through the radial interference fit and the mount rim is disposed in the rotor notch axially next to the shoulder of the rotor base.

12. The method of claim 11, wherein the mount rim is axially spaced from the shoulder of the rotor base.

13. The method of claim 11, wherein the mount rim is radially spaced from the rotor base.

14. The method of claim 1, wherein the seal runner further includes a runner arm radially between and connected to runner mount and the seal land.

15. The method of claim 14, wherein
the distal end of the seal runner is a first end of the runner mount, and the runner mount extends axially along the axis from the first end of the runner mount to a second end of the runner mount; and
the runner arm is disposed at the second end of the runner mount.

16. The method of claim 14, wherein
the seal land extends axially along the axis from a first end of the seal land to a second end of the seal land; and
the runner arm is connected to the seal land at an intermediate location axially between the first end of the seal land and the second end of the seal land.

17. The method of claim 1, wherein the aircraft powerplant comprises a gas turbine engine.

18. A method for assembling a structure of an aircraft powerplant, comprising:
arranging a seal runner with a rotor of the aircraft powerplant, the seal runner including a runner mount and a seal land disposed radially outboard of the runner mount, the runner mount projecting axially along an axis to a distal end of the seal runner, and the rotor projecting axially along the axis to a distal end of the rotor; and
mounting the seal runner onto the rotor using an installation tool, the installation tool including an inner locating surface and an outer locating surface, the inner locating surface axially recessed from and radially inboard of the outer locating surface, and the mounting of the seal runner comprising axially pressing the runner mount onto the rotor by moving the installation tool axially towards the rotor, with the outer locating surface axially pressed against the distal end of the seal runner, until the inner locating surface axially engages the distal end of the rotor;
wherein, after the seal runner is mounted onto the rotor using the installation tool, the runner mount is attached to the rotor through a radial interference fit between the runner mount and the rotor and the runner mount is axially unloaded.

19. The method of claim 18, further comprising removing the installation tool following the mounting of the seal runner and prior to full assembly of the aircraft powerplant.

* * * * *